April 13, 1937. G. W. BATCHELL 2,077,305
MULTIPLATE TRANSPARENCY
Filed Sept. 9, 1935
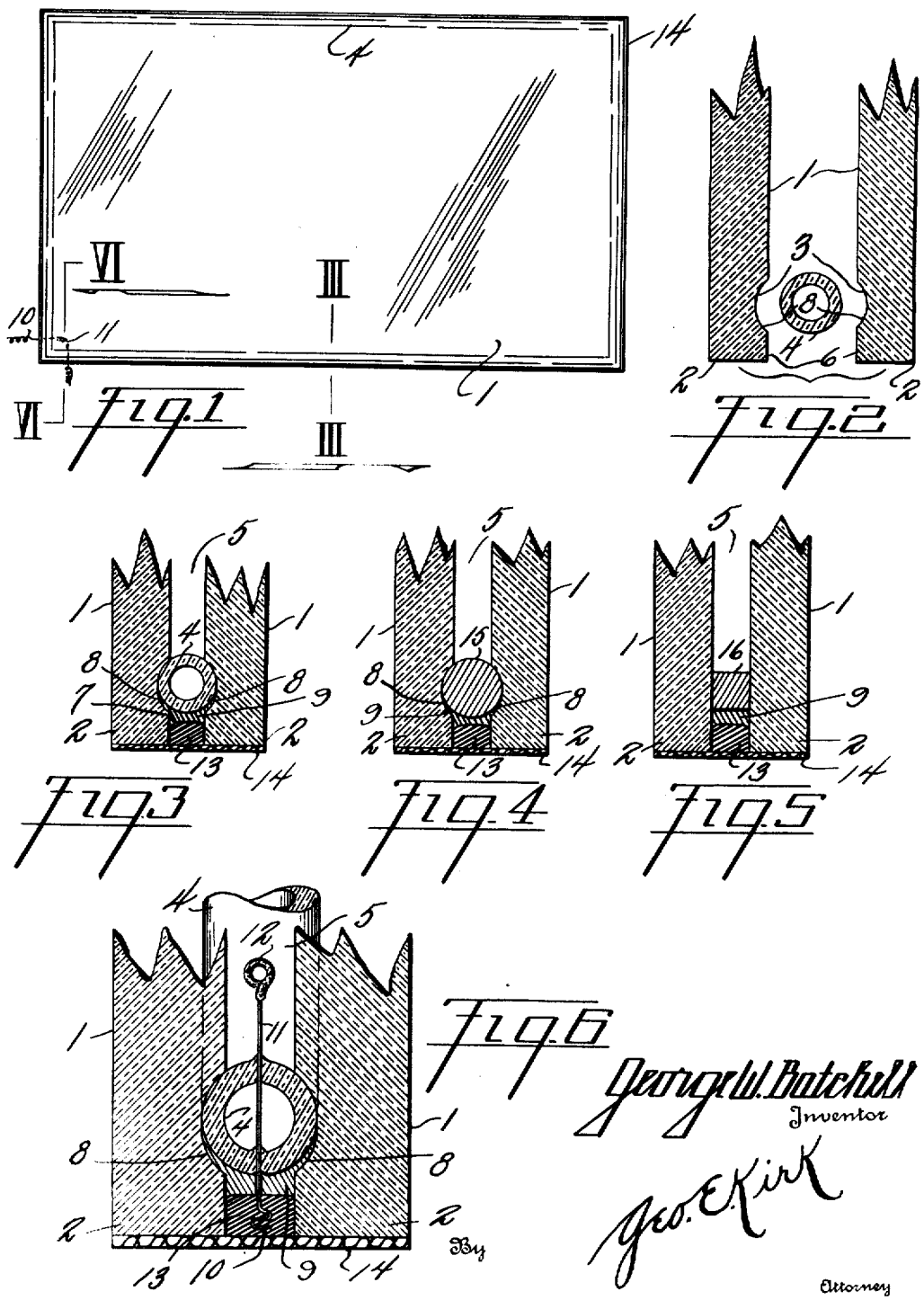

Patented Apr. 13, 1937

2,077,305

UNITED STATES PATENT OFFICE 2,077,305

MULTIPLATE TRANSPARENCY

George W. Batchell, Toledo, Ohio

Application September 9, 1935, Serial No. 39,774

2 Claims. (Cl. 49—92)

This invention relates to double wall or chamber-providing structures.

This invention has utility when incorporated in panels, especially of insulation, and may be transparency sections of glass.

Referring to the drawing:

Fig. 1 is a side elevation of an embodiment of the invention in a glass chambered panel;

Fig. 2 is a fragmentary distributed view of elements of the panel of Fig. 1;

Fig. 3 is a section on the line III—III, Fig. 1;

Fig. 4 is a view similar to Fig. 3, with departure in the spacing means as rod instead of tubular;

Fig. 5 is an additional view similar to Fig. 3, with a flat type of spacer; and

Fig. 6 is a section on the line VI—VI, Fig. 1.

Opposing similar dimension sheet or plate members 1 of glass have in such vitreous bodies near the edges 2 thereof opposing endless countersunk seats 3. In assembling these members 1 as a pair to form a panel, endless spacing means 4 may be positioned in the seats as approximating opposing registry. The plurality of members 1 provide the major extent walls of chamber 5 therebetween bounded by the spacing means 4. With the spacing means 4 of glass, herein shown as a sealed tube, the chamber is of low heat conductivity throughout. By using clear glass, which may be colorless, for the members 1, there is provided a transparency of effective insulation properties.

In bringing the members and spacing means as elements together in forming this panel, the effectiveness thereof, especially as against the transmission of heat or cold, is increased by sealing the panel into a unit. To this end there may be a controlled or sub-atmospheric gas charge in the chamber 5.

Sealing effectiveness is obtained by locating the spacing means 4 a slight distance inward from margins 6 of the members 1. There is thus provided an endless bounding groove 7 for the panel. Furthermore, there is advantage in so forming the seats 3 that the spacing means 4 does not snugly seat therein throughout but leaves slight clearance 8 into which bonding means 9 may adherently extend, providing a pair of check portions or legs of U-form in its anchoring and firm sealing with both the members 1 and the spacing means 4. This flow effectiveness even into small clearance regions is promoted by bringing the members 1 as well as the spacing means 4 up to a temperature where they still hold their shape. While this may be to a temperature approaching plasticity for the glass, it is to plasticity, and desirably therebeyond to fluidity, for the bonding means. Such rise in temperature expands the air in the chamber 5 while such may escape therefrom. The surfaces in the groove 7 have been cleaned of foreign matter or any interference with the bonding means 9 affinity therewith. The bonding means 9 is spread for continuity in its integral state throughout the length of the endless groove 7, and may even be as a unit bridging the spacing means 4 in its keying for the bonding means body at its legs in the clearance 8 and extension from member to member 1. Tendency of the glass of the panel to bulge in and out or "breathe" can be effectively held herein against leakage to result therefrom.

Importance attaches to the selection of bonding means and its physical properties compared with the physical properties of the elements of the panel. In this panel production and sealing, satisfactory results have been obtained in conjunction with the bonding teachings in U. S. Patent No. 2,035,241, March 24, 1936.

Promotion of a permanently controlled condition for the chamber 5 interior, especially as to any gas therein or exhaustion thereof may be had as to such gas chamber after the bonding means 9 is effective as a seal. Electrical conductor means 10 in the form of wires from exterior of the panel may have gas tight penetration through the spacing means 4 to resistance coil 11 and there be coated with magnesium, barium, or other substance to be ignited by the electric current through the wires, to further exhaust oxygen in the chamber 5 or supply some inert gas to promote strength in the panel against pressure disturbance. This "getter" operation may be undertaken as to minimize any opaque disturbance therefrom.

In practice the bonding means 9 may be of metal hardening as a thin skin or thickening medially into a more or less substantial key in the groove 7. The bonding means desirably does not fill the groove 7 but leaves a slight channel thereabout into which may be brushed a jacketing filler of pitch 13. This is a protecting cushion for the inorganic spacing means and sealing bond between the members 1. In order that there may not be disturbance of the spacing means as effective for the final gas treatment, this pitch 13 may have embedded therein the termini of the wires 10. The panel may be completed against casual wounding of the pitch cushion 13 or smear of exudings or scrapings therefrom by a bounding paper or fabric tape 14 of sufficient toughness to hold its shape and position in shipping the panel and bringing it to the place of installation, whether such be in a refrigeration space, as display counter, or even as a window section in air conditioned homes or buildings.

By using glass tube, such may be of a small diameter for close spacing of the multiple wall panel, and the structure be of light weight and substantial. Instead of adopting such tube 4, the spacing means may be by bar 15 (Fig. 4), and this even while still retaining seats 3 complementary thereto. However, an end which may approximate satisfaction may be obtained even by omission of the seats and adapting space 16 (Fig. 5) thereto, even of other materials than glass, for instance metal, as brass. Special illumination or even incandescence is available in this chambered device as a transparency, or colored or more or less configured symbols whether or not opaque may be thereon. Furthermore, the incandescence or illumination may emanate within the panel, say by spacing conductors 17 for supplying energy source.

What is claimed and it is desired to secure by Letters Patent is:

1. A unit comprising a paid of spaced vitreous-surface members in opposing relation, each member having a recessed seat, a spacer for the members nesting in said seats, and bonding means bridging between and having anchorage between the spacer and members at the respective seats.

2. A unit comprising a pair of spaced vitreous-surface members in opposing relation, and inorganic spacing means for the members comprising a body having a generally convex surface which provides re-entrant corner regions between said members and said body and solder continuously over said body and in said re-entrant corner regions and sealed with said members and said body.

GEORGE W. BATCHELL.

CERTIFICATE OF CORRECTION.

Patent No. 2,077,305.            April 13, 1937.

GEORGE W. BATCHELL.

It is hereby certified that error appears in the printed specification of the above numbered patent requiring correction as follows: Page 2, second column, line 5, claim 1, for the word "paid" read pair; and that the said Letters Patent should be read with this correction therein that the same may conform to the record of the case in the Patent Office.

Signed and sealed this 1st day of June, A. D. 1937.

(Seal)
Henry Van Arsdale
Acting Commissioner of Patents.

toughness to hold its shape and position in shipping the panel and bringing it to the place of installation, whether such be in a refrigeration space, as display counter, or even as a window section in air conditioned homes or buildings.

By using glass tube, such may be of a small diameter for close spacing of the multiple wall panel, and the structure be of light weight and substantial. Instead of adopting such tube 4, the spacing means may be by bar 15 (Fig. 4), and this even while still retaining seats 3 complementary thereto. However, an end which may approximate satisfaction may be obtained even by omission of the seats and adapting space 16 (Fig. 5) thereto, even of other materials than glass, for instance metal, as brass. Special illumination or even incandescence is available in this chambered device as a transparency, or colored or more or less configured symbols whether or not opaque may be thereon. Furthermore, the incandescence or illumination may emanate within the panel, say by spacing conductors 17 for supplying energy source.

What is claimed and it is desired to secure by Letters Patent is:

1. A unit comprising a paid of spaced vitreous-surface members in opposing relation, each member having a recessed seat, a spacer for the members nesting in said seats, and bonding means bridging between and having anchorage between the spacer and members at the respective seats.

2. A unit comprising a pair of spaced vitreous-surface members in opposing relation, and inorganic spacing means for the members comprising a body having a generally convex surface which provides re-entrant corner regions between said members and said body and solder continuously over said body and in said re-entrant corner regions and sealed with said members and said body.

GEORGE W. BATCHELL.

CERTIFICATE OF CORRECTION.

Patent No. 2,077,305.                 April 13, 1937.

GEORGE W. BATCHELL.

It is hereby certified that error appears in the printed specification of the above numbered patent requiring correction as follows: Page 2, second column, line 5, claim 1, for the word "paid" read pair; and that the said Letters Patent should be read with this correction therein that the same may conform to the record of the case in the Patent Office.

Signed and sealed this 1st day of June, A. D. 1937.

(Seal)                                         Henry Van Arsdale
                                               Acting Commissioner of Patents.

CERTIFICATE OF CORRECTION.

Patent No. 2,077,305. April 13, 1937

GEORGE W. BATCHELL.

It is hereby certified that error appears in the printed specification of the above numbered patent requiring correction as follows: Page 2, second column, line 5, claim 1, for the word "paid" read pair; and that the said Letters Patent should be read with this correction therein that the same may conform to the record of the case in the Patent Office.

Signed and sealed this 1st day of June, A. D. 1937.

Henry Van Arsdale
(Seal) Acting Commissioner of Patents